United States Patent [19]

Shaffer

[11] Patent Number: 4,609,971
[45] Date of Patent: Sep. 2, 1986

[54] ELECTROLYTIC CAPACITOR WITH POLYMER CONDUCTOR

[75] Inventor: Jesse S. Shaffer, Columbia, S.C.

[73] Assignee: North American Philips Corporation, New York, N.Y.

[21] Appl. No.: 522,072

[22] Filed: Aug. 11, 1983

[51] Int. Cl.[4] .............................................. H01G 9/00
[52] U.S. Cl. .................................... 361/433; 29/570; 252/62.2
[58] Field of Search .................... 361/633; 29/570; 228/5.1; 252/500, 62.2; 528/326, 313; 524/284

[56] References Cited

U.S. PATENT DOCUMENTS 3,955,126  5/1976  Murakami et al. ................ 361/433
4,222,903  7/1980  Heeger et al. ..................... 252/518

OTHER PUBLICATIONS

North American Philips Corporation, "Doped Polyacrylonitrile", 1967.
Technical Insight, Inc., "Organic Conductors", 1982.
Murokumi et al, "An Aluminum Solid Electrolytic Capacitor with an Organic Semiconductor Electrolyte", 1975.

Primary Examiner—L. T. Hix
Assistant Examiner—Douglas S. Lee
Attorney, Agent, or Firm—Jack E. Haken

[57] ABSTRACT

A solid electrolytic capacitor includes a conductive polymer electrolyte. The electrolyte may comprise p-doped polyacrylonitrile, polypyrrole, or polyacetylene.

7 Claims, 2 Drawing Figures

ELECTROLYTIC CAPACITOR WITH POLYMER CONDUCTOR

The invention relates to electrolytic capacitors. More specifically, the invention relates to solid electrolytic capacitors which includes a conductive polymer.

BACKGROUND OF THE INVENTION

Electrolytic capacitors typically comprise a metal oxide dielectic layer which is electrochemically formed on the surface of a metal anode. A conductive electrolyte is disposed in intimate contact with the outer surface of the dielectric. The metal anode forms one electrode of the capacitor while the conductive electrolyte forms the second electrode. Ideally, the electrolyte must be chemically inert, and have good temperature stability and a proper electrical resistivity. If the electrolyte resistivity is too high, the capacitor will have a high equivalent series resistance and consequently will have a high loss factor. If the resistivity of the electrolyte is too low, electrolytic breakdown in the form of sparking occurs, and results in failure of the capacitor. Typical prior art liquid electrolytes have a resistivity between approximately 100 ohm-cm and 1,000 ohm-cm.

Wet electrolytic capacitors use a non-aqueous electrolyte, typically a solvent, a conductive salt, and a controlled amount of water. The anode and cathode of the capacitor are formed from two metal foil conductors which are separated by a porous, nonconductive material, for example gauze or unsized paper. The separator is saturated with the electrolyte. Theoretically, the cathode foil has no insulation or oxide coating and serves only to provide an electrical contact to the electrolyte. Actually, a thin oxide film usually forms on the cathode foil and slightly reduces the overall capacitacce of the component.

The conductivity of electrolytes used in wet electrolytic capacitors tends to vary with temperature. Furthermore, the useful life expectancy of wet electrolytic capacitors is inherently limited by evaporation or other loss of the electrolyte, while the life expectancy of dry electrolytic capacitors is not inherently limited by any equivalent effect.

Solid electrolytic capacitors are more stable and less sensitive to shock and vibration than wet electrolytic capacitors. Most prior art dry electrolytic capacitors utilize a manganese dioxide electrolyte which is formed by pyrolyzing $Mn(NO_3)_2$ at or above approximately 275° C. This is a relatively violent reaction which often damages the capacitor structure rendering it unuseful. Furthermore, nitrates which are formed during the pyrolyzation can react with the oxide dielectric.

The cathode contact in prior art capacitors with a manganese dioxide electrolyte was usually formed by painting a layer of conductive carbon particles on the surface of the manganese dioxide and then providing a metallic contact on the carbon layer, for example by utilizing a conductive metal paint.

SUMMARY OF THE INVENTION

In accordance with the present invention the manganese dioxide solid electrolyte of prior art capacitors is replaced with a solid conductive polymer. Typically, the polymer may comprise p-doped polyacetylene, polypyrrole, or polyacrylonitrile. An oxide dielectric layer is electrochemically formed on a metal anode electrode in the manner of the prior art. A body of polymer electrolyte may be cast directly in place over the oxide layer or may comprise a polymer film which is wound over the surface of the dielectric layer. A cathode connection to the electrolyte may be provided by a metal foil which is cast into the polymer body or by depositing successive layers of carbon particles and metal conductive particles on a surface of the polymer, for example by using the conductive paints of the prior art.

BRIEF DESCRIPTION OF THE DRAWINGS

The following description of the preferred embodiments may be understood by reference to the drawings in which.

DESCRIPTION OF THE PREFERRED EMBODIMENT

Figure 1:
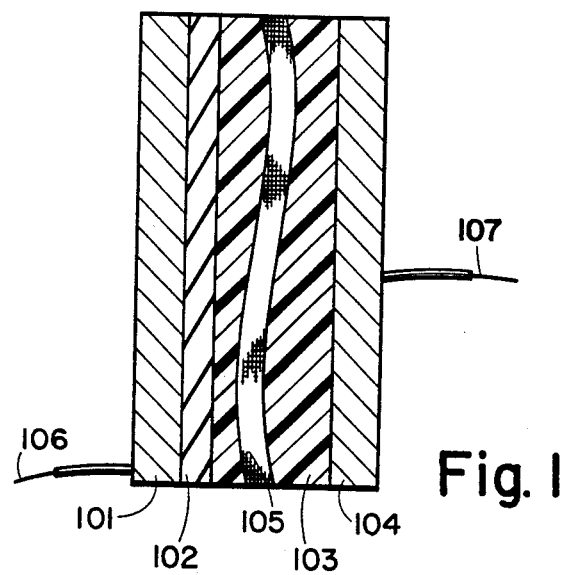
FIG. 1 is a schematic sectional view of a capacitor structure of the present invention which utilizes a foil anode electrode.

FIG. 1 is a preferred embodiment of a capacitor having a solid polymer electrolyte. A metal anode foil 101, typically high purity aluminum, is provided with a aluminum oxide dielectric layer 102 using any of the electrochemical forming techniques known in the prior art. The cathode electrode is laminated with a porous glass fiber separator 105 and a metal cathode electrode foil 104, typically high purity aluminum, and is wound to form a capacitor roll in the manner of the prior art. The surface of the electrodes and the volume of the separator are then impregnated with a p-doped liquid polymer which is cured to form a solid electrolyte 103. Wire leads 107 are then attached to the cathode and anode foils.

The solid electrolyte is preferably polyacrylonitrile (PAN) doped with lithium. Alternately, iodine, bromine, group I metal perchlorates, group I tetrafluoroborates or arsenic pentafluoride may be used as an anionic dopant.

The resistivity of the doped polymer is preferably between 1 ohm-cm and 1,000 ohm-cm but the invention is not so limited and polymers having other conductivity values may be utilized in special applications.

Figure 2:
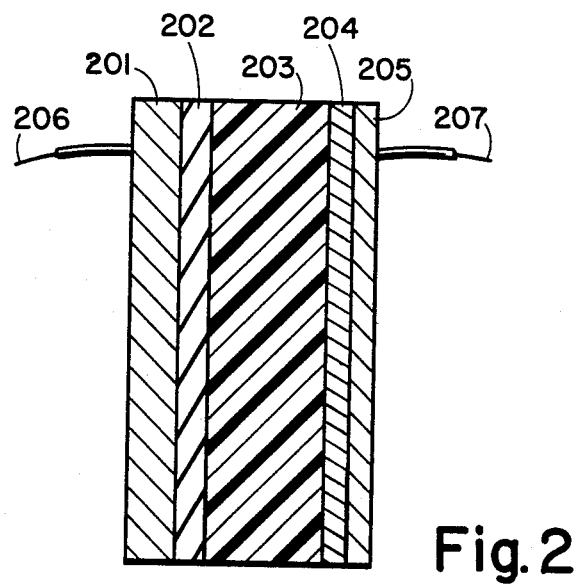
FIG. 2 is a schematic sectional view of an alternate embodiment of a capacitor of the present invention which utilizes electrodes which are deposited on the surface of the conductive polymer.

FIG. 2 shows an alternate construction of a capacitor in accordance with the present invention. An oxide dielectric 202 is formed on the surface of an anode foil 201 in the same manner as previously described with respect to FIG. 1. A conductive polymer electrolyte 203 is applied directly to the surface of the dielectric layer 202. The surface of the electrolyte 203 which is opposite the dielectric 202 is provided with a thin film 204 of conductive carbon particles, for example by applying a conductive carbon paint to the surface. A metallic contact layer 205 is then applied over the carbon layer 204, for example by application of a conductive paint. Leads 207 are then attached to the cathode foil and the contact layer 205.

The conductive polymer layer 203 may be cast directly in place, for example by using polyacrylonitrile or may comprise a conductive film of polypyrrole or polyacetylene. Methods of manufacturing and depositing conductive polymer films are described, for example, in European Patent Application No. 81-400522 (polyacrylonitrile), U.S. Pat. Nos. 4,222,903 and 4,269,738 (polyacetylene), and U.S. Pat. Nos. 4,309,530, 4,281,105, and 4,263,187 (polypyrrole) which are incorporated herein, by reference, as background material.

EXAMPLE

25% (by weight) polyacrylonitrile (PAN) MW=$9.4 \times 10^4$, in powdered form was dissolved in butyrolactone plus 1% (by weight) water. 20% (by weight) lithium perchlorate ($LiClO_4$) was dissolved in the solution. The solution was brought to 150° C. and held there for 30 minutes. A dark brown, vicous liquid was produced.

Capacitors were wound using glass fiber separators and an etched aluminum anode foil. An aluminum cathode foil formed the second electrode. The capacitors were wound dry and then vacuum impregnated for one hour (or until the outgassing ceased) in the polymer liquid. The capacitors were removed and dried for three hours at 85° C.

The resistivity of the polymer (measured with a 4-point probe) was approximately 1,000 ohm cm. The capacitor averaged 23.2 microfarads and 0.08 TAND at 120 Hz 25° C. (85% capacitance realization). Specific leakage (100×ua/uc) averaged 9.26.

A similar dry wound capacitor immersed in a conventional liquid electrolyte (resistivity 600 ohm cm) had a capacitance of 27 microfarads and 0.04 TAND.

Similar capacitors with a solid manganese dioxide electrolyte had a capacitance of 17 microfarads and 0.054 TAND with a leakage current of 0.75 uA.

Although the examples given above have been described with respect to aluminum electrolytic capacitors, the invention is not so limited and may utilized with other known capacitors structures, for example tantalum foil capacitors.

What is claimed is:

1. A dry electrolytic capacitor comprising:
   a metal anode foil;
   an insulating oxide layer disposed on the surfaces of the anode foil;
   a solid body of a conductive p-doped polyacrylonitrile polymer electrolyte, disposed in intimate physical contact with outer surfaces of the oxide layer;
   anode contact means electrically connected to the anode foil; and
   cathode contact means electrically connected to the polymer body.

2. The capacitor of claim 1 wherein the polymer includes an anionic dopant selected from the group consisting of iodine, bromine, group I metal perchlorates, group I tetrafluoroborates, and arsenic pentafluoride.

3. The capacitor of claim 2 wherein the conductive polymer includes lithium perchlorate as an anionic dopant.

4. The capacitor of claim 3 wherein the cathode contact means comprising a metal cathode foil disposed within the polymer body.

5. The capacitor of claim 3 wherein the cathode contact means comprise an electrical contact layer disposed on a surface of the polymer body.

6. The capacitor of claim 5 wherein the contact layer comprises one or more layers of conductive paint disposed on the surface of the polymer body.

7. The capacitor of claim 6 wherein the contact layer comprises a layer containing conductive carbon particles.

* * * * *